United States Patent Office 2,721,871
Patented Oct. 25, 1955

2,721,871

17-ALKYL DERIVATIVES OF 19-NORTESTOSTERONE

Frank B. Colton, Chicago, Ill., assignor to G. D. Searle & Co., Chicago, Ill., a corporation of Illinois No Drawing. Application September 13, 1954, Serial No. 455,751

4 Claims. (Cl. 260—397.4)

The present invention relates to a new group of hypotensive and anabolic agents with low androgenic activity and, more particularly, to 19-nortestosterone derivatives substituted in the 17-position by a lower alkyl radical containing 2–8 carbon atoms.

These compounds can be represented by the general structural formula

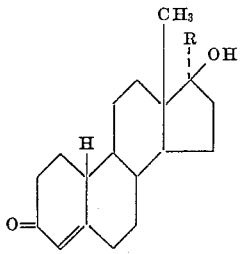

wherein R is a lower alkyl radical containing 2–8 carbon atoms such as ethyl, straight and branched propyl, butyl, pentyl, hexyl, heptyl, and octyl.

The compounds of my invention are valuable anabolic agents, i. e. they promote nitrogen retention. They produce this effect at a dosage which causes only a very low degree of androgenic activity. It is well known that testosterone propionate is an effective anabolic agent but its clinical utility for that purpose is greatly limited because in many patients the androgenic effects are undesirable. In the case of the claimed compounds the effective anabolic doses are so small that prolonged administration becomes practical without undesirable side effects.

Another important field of utility of these compounds is their anti-hypertensive effect, an effect which is not shared by 19-nortestosterone or its 17-methyl derivative. The compounds of this invention are particularly effective in overcoming the hypertension produced by the mineralocorticoid hormone desoxycorticosterone.

These compounds are conveniently obtained by the treatment of the methyl ether of esterone with an organo-metallic compound of the type RLi or RMgBr (R being a lower alkyl group as defined hereinabove) and a Birch type reduction of the 3-methoxy-17α-alkyl-1,3,5-estratrien-17-ol thus formed.

An alternative source for the preparation of the 17-ethyl-19-nortestosterone is the 3-methoxy-13-methyl-17α - ethynyl - 1,4,6,7,8,9,11,12,13,14,16,17-dodecahydro-15H-cyclopenta[a]phenanthren-17-ol of my U. S. Patent No. 2,691,028, issued October 5, 1954, which is converted by treatment with hydrochloric acid in aqueous methanol to 17α-ethynyl-19-nortestosterone; the latter is then hydrogenated over a noble metal catalyst to reduce the ethynyl to an ethyl group. An alternative procedure is also available for the preparation of the 17-propyl derivative. The methyl ether of estrone is treated with allyl magnesium bromide and successive hydrogenation of the allyl group in the presence of a noble metal catalyst and of the aromatic ring by the Birch process, followed by treatment with hydrochloric acid in aqueous methanol yields 17-propyl-19-nortestosterone.

The compounds which constitute my invention and the methods for their preparation will apepar more fully from the consideration of the following examples which are given for the purpose of illustration only and are not to be construed as limiting the invention in spirit or in scope. In these examples quantities are indicated in parts by weight.

Example 1

To a refluxing solution of 47.5 parts of 3-methoxy-13-methyl - 17α-ethynyl-1,4,6,7,8,9,11,12,13,14,16,17-dodecahydro-15H-cyclopenta[a]phenanthren-17-ol in 3200 parts of methanol and 1000 parts of water are added 240 parts of concentrated hydrochloric acid. Refluxing is continued for an additional 5 minutes after which the solution is maintained at room temperature for 15 minutes. Then 13,000 parts of water are added and the mixture is cooled to 0° C. After standing for several hours at that temperature, the mixture is filtered and the precipitate is dried and crystallized from ethyl acetate. The 17-ethynyl-19-nortestosterone thus obtained melts at about 202–204° C.

Through a mixture of 11 parts of charcoal containing 5% palladium and 2000 parts of dioxane a stream of hydrogen is passed for 60 minutes. Then 86 parts of 17-ethynyl-19-nortestosterone in 1500 parts of dioxane are added and the mixture is hydrogenated until 2 moles of hydrogen are absorbed. The catalyst is then removed by filtration and the solvent is evaporated under vacuum. The crystalline residue is dissolved in 2700 parts of benzene and thus applied to a chromatography column containing 5000 parts of silica gel. The column is washed with 2700 parts of benzene, 4500 parts of a 10% solution of ethyl acetate in benzene and 27,000 parts of a 20% solution of ethyl acetate in benzene and is then eluted with 30,000 parts of a 30% solution of ethyl acetate in benzene. The resulting eluate is concentrated under vacuum and the residue is recrystallized from methanol and dried to constant weight at 75° C. The 17-ethyl-19-nortestosterone thus obtained melts at about 140–141° C. Its ultraviolet absorption spectrum shows a maximum at 240 millimicrons with a molecular extinction coefficient of 16,500.

Example 2

To a stirred mixture of 8.5 parts of magnesium in 140 parts of ether there are added 5 parts of allyl bromide in 15 parts of ether. Then, in the course of 45 minutes, a mixture of 20 parts of the methyl ether of esterone and 95 parts of allyl bromide in 630 parts of ether are added. After 3 hours of refluxing the mixture is cooled to 0° C., washed repeatedly with 10% ammonium chloride solution and then with water, dried over anhydrous sodium sulfate, filtered and evaporated. The residue is taken up in ether. The ether solution is partially concentrated and diluted with petroleum ether. The crystalline 17α-allyl-3-methoxy-1,3,5(10)-estratrien-17-ol thus obtained melts at about 91–91.5° C.

A mixture of 11.5 parts of 17α-allyl-3-methoxy-1,3,5-(10)-estratrien-17-ol, 3 parts of charcoal containing 5% palladium and 160 parts of ethanol is hydrogenated until one mole of hydrogen has been absorbed. The mixture is then filtered through filter aid and the filtrate is evaporated under vacuum. The residue is crystallized from a mixture of ether and methanol to yield 17α-propyl-3-methoxy-1,3,5(10)-estratrien-17-ol melting at about 93–94° C.

To a stirred mixture of 6 parts of 17α-propyl-3-methoxy-1,3,5(10)-estratrien-17-ol in 500 parts of ammonia and 140 parts of ether, 7 parts of lithium are added in the course of 20 minutes. The mixture is stirred for 30 minutes after which 46 parts of ethanol are added dropwise in the course of an hour. Stirring is continued until all of the ammonia has disappeared. Then water is added and the ether layer is separated, washed with water, dried over anhydrous sodium sulfate, filtered and evaporated. Crystallization from a mixture of ether in methanol yields 17α-propyl-3-methoxy-2,5(10)-estradien-17-ol melting at about 150–152° C.

A mixture of 18 parts of 17α-propyl-3-methoxy-2,5-(10)-estradien-17-ol, 320 parts of methanol, 80 parts of water, and 18 parts of concentrated hydrochloric acid is refluxed for 5 minutes and then permitted to stand for 15 minutes in hot water. A sufficient amount of hot water is added until the mixture becomes turbid. Upon standing 17-propyl-19-nortestosterone precipitates which, crystallized from a mixture of acetone and petroleum ether, melts at 120–122° C.

*Example 3*

To a stirred suspension of 16.5 parts of the methyl ether of estrone in 300 parts of ether there is added a solution of butyl lithium prepared from 115 parts of 1-bromobutane and 6.7 parts of lithium in 600 parts of ether. Stirring is continued for an hour after which the mixture is decomposed with methanol and dilute sulfuric acid and extracted with ether. This extract is washed with saturated sodium chloride solution, dried over anhydrous sodium sulfate, filtered and evaporated under nitrogen. The residue is crystallized from methanol and water and then applied in benzene solution to a chromatography column containing 1000 parts of alumina. The column is washed with 1800 parts of a 10% solution of petroleum ether in benzene and then eluted with 9000 parts of a 10% solution of petroleum ether in benzene. This eluate is evaporated and the residue is recrystallized from aqueous methanol to yield 3-methoxy-17α-butyl-1,3,5(10)-estratrien-17β-ol.

To a solution of 37.2 parts of this compound in 500 parts of ether and 500 parts of liquid ammonia are added 3.5 parts of short strips of lithium wire with stirring. The dark blue solution is stirred for 10 minutes after which 32 parts of methanol are added dropwise in the course of 15 minutes to decolorize the solution. Then 56 additional parts of methanol are slowly added and, after most of the ammonia has been evaporated, 1100 parts of ether and 700 parts of water are added with stirring. The organic layer is separated, washed with saturated sodium chloride solution, dried over sodium sulfate, filtered and concentrated under vacuum. To the oily residue are added 1110 parts of methanol and 500 parts of water and the mixture is heated to reflux. Then 240 parts of concentrated hydrochloric acid are added and refluxing is continued for 6 minutes. The mixture is then extracted with ether. The ether solution is washed with a saturated solution of sodium chloride, dried over sodium sulfate, filtered and evaporated under vacuum. The residue is applied in benzene to a chromatography column containing 350 parts of silica gel. The column is washed with 500 parts of benzene and then with 3000 parts of a 10% solution of ethyl acetate in benzene. Elution with 2000 parts of a 20% solution of ethyl acetate in benzene, concentration of the eluate and crystallization from aqueous methanol then yields 17-butyl-19-nortestosterone which melts at about 127–128° C.

*Example 4*

Substitution of an equivalent amount of 1-bromooctane for the 1-bromobutane in the process of the preceding example yields 17-octyl-19-nortestosterone. The infrared absorption spectrum of that compound shows maxima at 2.8 and 6.05 microns. The ultraviolet absorption spectrum shows a maximum at 240.5 millimicrons with a molecular extinction coefficient of 17,000.

I claim:

1. A compound of the structural formula

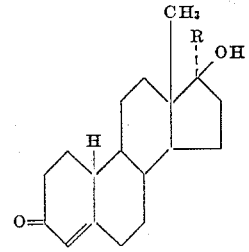

wherein R is a lower alkyl radical containing 2–8 carbon atoms.
2. 17-ethyl-19-nortestosterone.
3. 17-propyl-19-nortestosterone.
4. 17-butyl-19-nortstosterone.

References Cited in the file of this patent

UNITED STATES PATENTS

| | | |
|---|---|---|
| 2,308,835 | Ruzicka | Jan. 19, 1943 |
| 2,374,369 | Miescher | Apr. 24, 1945 |
| 2,698,855 | Hicks | Jan. 4, 1955 |

FOREIGN PATENTS

| | | |
|---|---|---|
| 211,488 | Switzerland | Dec. 2, 1940 |
| 211,653 | Switzerland | Jan. 16, 1941 |

OTHER REFERENCES

Jones et al.: Jour. Am. Chem. Soc., 72, 956–61 (1950).
Birch: Jour. Chem. Soc. 1950, 367–68.